United States Patent [19]

Bollé Robert

[11] Patent Number: 5,035,498
[45] Date of Patent: Jul. 30, 1991

[54] SPECTACLES WITH REMOVABLE SIDE-PIECES OR BAND

[75] Inventor: Bollé Robert, Oyonnax, France

[73] Assignee: Etablissements Bolle Georges, Robert et Maurice, Oyonnax, France

[21] Appl. No.: 462,474

[22] Filed: Jan. 9, 1990

[30] Foreign Application Priority Data

Nov. 21, 1989 [FR] France ............................ 89 15235

[51] Int. Cl.⁵ .............................................. G02C 5/14
[52] U.S. Cl. .................................... 351/116; 351/110
[58] Field of Search ................ 351/105, 106, 110, 116

[56] References Cited

U.S. PATENT DOCUMENTS 2,367,418  1/1945  Morrell .............................. 351/110
4,488,792 12/1984  Wagner .
4,744,646  5/1988  Stewart .
4,801,199  1/1989  Penora .

FOREIGN PATENT DOCUMENTS 2049410  3/1971  France .
2103829A 2/1983  United Kingdom .

Primary Examiner—Paul M. Dzierzynski
Attorney, Agent, or Firm—Fleit, Jacobson, Cohn, Price, Holman & Stern

[57] ABSTRACT

The invention relates to spectacles comprising a shield (1), side-pieces (2) and coupling means for coupling the side-pieces (2) to the spectacles. According to the invention, the coupling means are arranged for removably coupling the side-pieces to the spectacles and include: a clip (4) integral with the side-pieces and comprising two wings (5, 6) between which extends an end of the shield, a pin (17) mounted on one (6) of the said wings so as to be able to move between a first position in which it extends between the two wings and a second position in which it extends beyond; and a mortise (24) provided in the said end of the shield and arranged to cooperate with the pin (17) in the said first position and thus immobilize the said end.

7 Claims, 2 Drawing Sheets

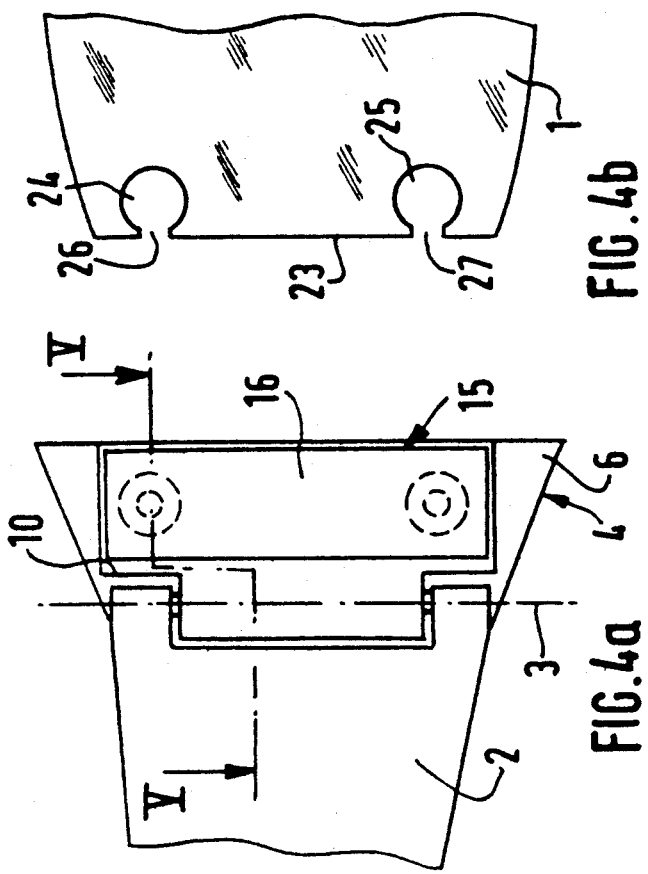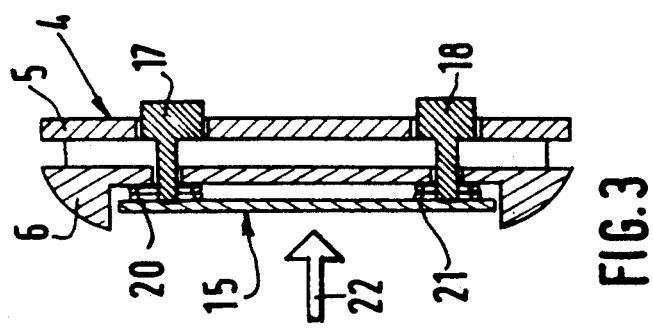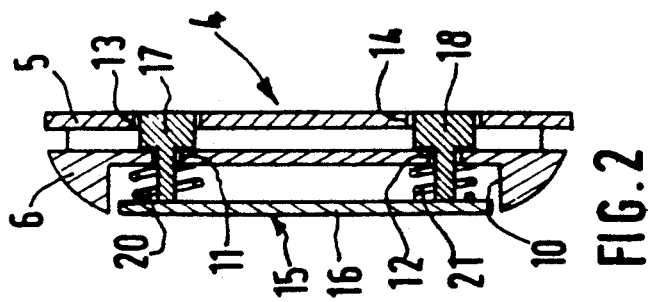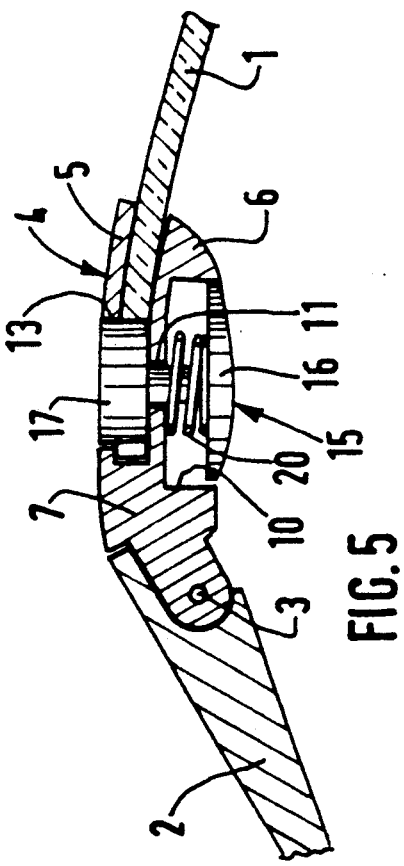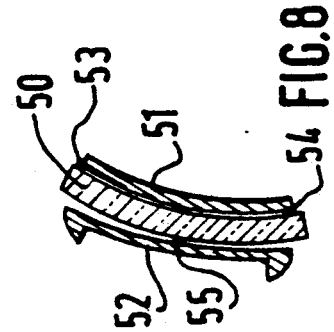

SPECTACLES WITH REMOVABLE SIDE-PIECES OR BAND

The present invention relates to spectacles comprising a shield or two eyepieces, means for holding them on the wearer's face, such as side-pieces or a band, coupling means for coupling the holding means to the spectacles and, as applicable, a frame.

The problem that the present invention aims to solve is that of providing coupling means permitting easy replacement of the holding means or of the shield by the wearer of the spectacles.

The invention further aims to provide coupling means of a type that can be adapted to the different curvatures of existing contoured shields. With this in mind, the different types of known contoured shield are listed below:

NORMAL FLAT SHIELDS
NORMAL CYLINDRICAL OR "TILE" SHIELDS
NORMAL SHIELDS WITH SPHERICAL CURVATURE
SPECIAL TORIC SHIELDS WITH DOUBLE CURVATURE, using horizontal and vertical bases of different dioptres:
 either to favour a horizontal useful surface as in the case of the "KILLY TORE" spectacles of 1971, the shield of which has a horizontal meridian of 6 dioptres and vertical meridian of 10 dioptres, modifiable as required;
 or to favour a vertical useful surface, as in the case of the "SUPER NYLSUN" spectacles of 1963, the shield of which has a horizontal meridian of 10 dioptres and a vertical meridian of 8 dioptres, modifiable as required.

Since these forerunners, all the different values in terms of arc or dioptres have been studied or practised.

Curvatures corresponding to all types of shield can thus be included in the field covered by this assembly.

According to the invention, the coupling means are arranged so as to couple the holding means removably to the spectacles and include:

a clip integral with the said holding means and comprising two wings arranged facing one another and between which extends an end of the shield, of the eyepieces or of the frame; a pin mounted on one of the said wings so as to be able to move substantially perpendicularly thereto between a first position in which it extends between the two wings and a second position in which it extends beyond; and a mortise pierced in the said end of the shield, of the eyepieces or of the frame and arranged to cooperate with the pin in the said first position and thus to immobilize the said end.

According to a preferred form of embodiment, the pin is connected to a push-button by a shank passing through one of the wings of the clip, the other wing having a through hole through which the pin extends in its second position, the said mortise being provided in the vicinity of a side edge of the said end of the shield, of the eyepiece or of the frame, and emerging on the said edge in an opening arranged to be traversed by the said shank.

A complementary problem that the invention aims to solve is that of ensuring precise positioniung of the holding means in relation to the spectacles.

For this purpose, and according to a first solution, the mortise and the pin are square-shaped, preventing any rotation of the clip in relation to the spectacles.

According to a second solution, the said coupling means include two pins distant from one another along a side edge of the said end of the shield, of the eyepieces or of the frame, and two corresponding mortises.

Another complementary problem that the invention aims to solve is that of ensuring, in use, that the pin is satisfactorily maintained in its first position wherein the holding means are coupled to the spectacles.

For this purpose, the spectacles include biasing means to return the pin to the said first position.

According to a preferred form of embodiment, the said biasing means include a spring.

Further details and advantages of the invention will emerge from the following description, appertaining to a number of non-limitative preferred forms of embodiment, with reference to the annexed drawings, wherein:

FIG. 2 is a cross-sectional view along line II—II of FIG. 1, with the shield removed;

FIG. 3 is a view similar to that of FIG. 2, but representing the spectacles in an unlocked condition;

FIG. 4a is a left-hand view of FIG. 2;

FIG. 4b is a partial view of the shield arranged to cooperate with the locking device of FIG. 4a;

FIG. 5 is an enlarged view along line V—V of FIG. 4a, including the shield of FIG. 4b;

FIG. 8 is a schematic cross-sectional view along line II—II of FIG. 1, the shield being represented and having, alternatively, a curvature in the vertical direction.

Figure 1:
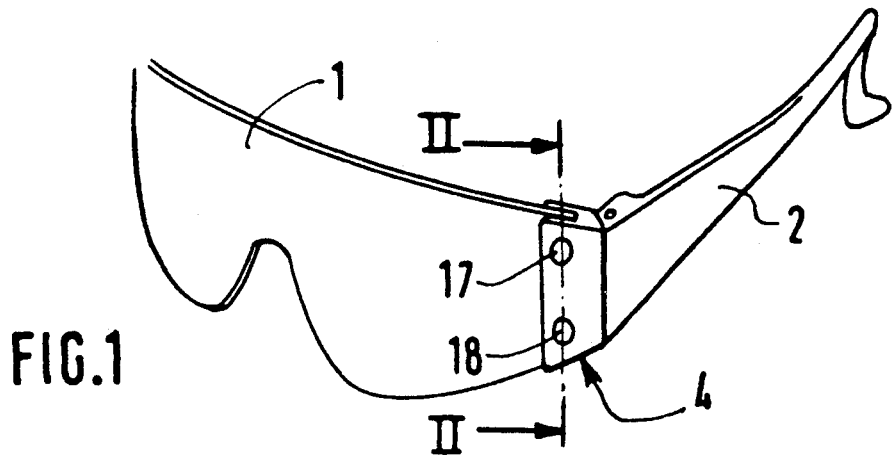
FIG. 1 is a perspective view of a pair of spectacles according to a preferred form of embodiment of the invention.

The spectacles represented in FIG. 1 include a transparent shield 1, horizontally curved, onto which are removably fixed two side-pieces 2, only one of which is represented.

At one end of each side-piece 2 there is pivotally mounted about a pivot pin 3 a clip 4 comprising two wings 5, 6 facing each other. The two wings are joined along a common edge 7 extending substantially parallel to pivotal axis 3 and in the proximity thereof in such a way that the two wings are spaced from one another by a distance that is very slightly greater than the thickness of shield 1.

One wing 6, or inner wing, designed to be located opposite the spectacle wearer's face, has, on a surface furthest from the other wing 5, or outer wing, a rectangular recess 10 extending along the pivotal axis 3 and over a major portion of the surface of the wing. For this purpose, inner wing 6 has a thickness greater than that of outer wing 5. Opposite recess 10, inner wing 6 has two circular through holes 11, 12 spaced apart from one another in the direction of the pivotal axis 3.

Outer wing 5 has two circular through holes 13, 14 the diameter of which is greater than that of holes 11, 12 of inner wing 6 and which are arranged concentrically therewith.

A push-button 15 comprises a rectangular plate 16 extending over a surface that is slightly smaller than the surface of recess 10 of inner wing 6, and on which project perpendicularly two cylindrical pins, 17, 18, having a small-diameter portion closest to plate 16 and forming a shank prolonged by a large-diameter portion.

The said small diameter is slightly smaller than that of holes 11, 12 of inner wing 6, while the said large diameter is slightly smaller than that of holes 13, 14 of outer wing 5, while being at the same time greater than that of holes 11, 12 of inner wing 6.

The distance between the two pins 17, 18 corresponds to that between holes 11, 12 in plate 16. The small-diameter portion of each pin 17, 18 extends through one of the holes 11, 12 in inner wing 6, while its large-diameter portion extends through the corresponding hole 13, 14 in outer wing 5. A helicoidal spring 20, 21 is mounted around the small-diameter portion of each pin 17, 18 and bears, on one side, on inner wing 6 and, on another side, on plate 16.

The two pins, 17, 18, are mounted on plate 16 using any appropriate means (screwing, ultrasonic soldering, etc.).

The length of the large-diameter portion of each pin 17, 18 is such that, in the case of FIG. 2, in which push-button 15 is not pressed, this portion extends substantially fron one wing to the other, and preferably right into holes 13, 14 of outer wing 5.

The length of the small-diameter portion of each pin 17, 18 is such that, in the case of FIG. 3, in which the push-button is subjected to a force exerted in the direction of arrow 22 by the spectacle wearer, this portion extends at least from one wing to the other.

Shield 1 is provided, in particular, with two side edges 23 (FIG. 4b) whereby it cooperates with clips 4. Each side edge 23 is straight. Two circular mortises, 24, 25, having a diameter slightly greater than that of the large-diameter portions of pins 17, 18 are arranged in the proximity of side edge 23 and spaced by a distance equal to that between the two pins 17, 18.

Each mortise 24, 25 emerges on side edge 23 in an opening 26, 27, the width of which is greater than the diameter of the small-diameter portion of pins 17, 18 and smaller than the diameter of the large-diameter portion of the said pins.

In use, side-pieces 2 are mounted on the eyepiece as follows. The wearer applies pressure to push-button 15 and then introduces one of the edges 23 of shield 1 between the two wings 5, 6 of the corresponding clip until it abuts with edge 7 of the clip. In this condition, the two pins, 17, 18, are centered in relation to mortises 24, 25. The spectacle wearer then releases push-button 15 so that the large-diameter portions of pins 17, 18 lodge respectively in mortises 24, 25 (FIG. 5), thus preventing the shield from being withdrawn from the clip.

Side-pieces 2 are removed by observing the reverse procedure.

Figure 6:
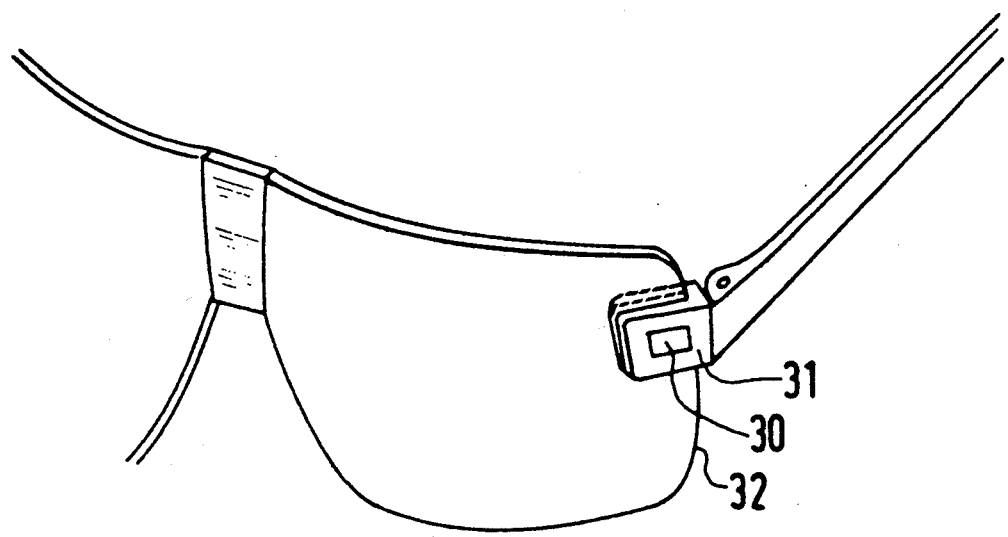
FIG. 6 is a perspective view of a pair of spectacles according to a second form of embodiment of the invention.

Alternatively, the push-button can comprise just one pin 30 (FIG. 6). In this case, clip 31 can extend only over a small portion of side edge 32 of the shield. Preferably, the single pin 30 is square and the shield has a mortise of a matching shape so as better to secure the clip against rotation in relation to the shield.

Figure 7:
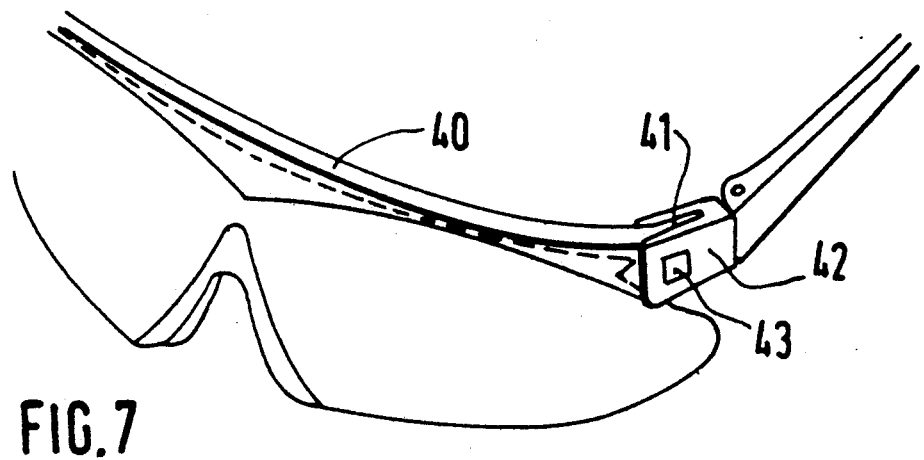
FIG. 7 is a perspective view of a pair of spectacles according to a third form of embodiment of the invention.

According to another variant (FIG. 7), the spectacles include a frame 40 having two extensions 41 suitable for being received in clips 42 and comprising a mortise designed to cooperate with a pin 43.

According to another variant, not represented, the means for holding the spectacles on the wearer's face are formed, not by side-pieces, but by a supple, in particular elastic, band. In this case, the clip comprises, not a pivot pin such as 3, but a window designed to receive an end of the band.

According to another variant, not represented, the means for biasing the pins include, not a spring but suitable materials arranged so as to produce magnetic attraction between inner wing 6 and pins 17, 18.

The use of the pin biasing means can be dispensed with if the play between the through holes 11, 12, 13, 14 of the wings of clip 4 and pins 17, 18 is very small. It has been noted, in fact, that push-button 15 is held securely enough in the position in which the pins lock the side-pieces to the eyepiece not to be displaced inadvertently.

Advantageously, the two wings 51, 52 of each clip are vertically cambered to match the vertical curvature of shield 50, as represented in an exaggerated manner in FIG. 8. It has been found that a clip curvature equal to a base 6 dioptre enables the clip to adapt to all shield curvatures habitually encountered, ensuring positive contact between the shield 50 and wings 51, 52 at three points 53, 54, 55.

I claim:

1. Spectacles including lens means for disposition across the wearer's face and including opposite ends to be disposed at opposite sides of the wearer's head, holding means for holding the lens means on the wearer's face, and coupling means removably coupling said holding means to said opposite ends, said coupling means including:
   a clip integral with said holding means and comprising two wings arranged opposite each other and between which extends one end of said lens means, a first wing having a first hole therethrough of a predetermined dimension and a second wing having a second hole therethrough of a dimension greater than said first hole;
   an elongated shank having at one end a push-button and at a second end an enlarged pin, said pin being received through said second hole, said shank, between said push-button and pin, being received through said first hole, said push-button being of a size too great to pass through said first hole so that said push-button may be moved between a first position in which said pin extends between said wings and a second position in which said shank, between said push-button and pin, extends between said wings;
   a mortise provided in said end of said lens means, said mortise having a dimension adapted to receive said pin and emerging at said one end of said shield lens means by an opening having a dimension adapted to receive said shank therethrough and preventing passage of said pin therethrough.

2. The spectacles of claim 1 wherein said mortise and pin are square-shaped.

3. The spectacles of claim 1 wherein said coupling means includes two pins spaced from one another along a side edge of said one end of said lens means, two matching mortises and two shanks connected by a common push-button.

4. The spectacles of claim 1 wherein said shank and pin pass through their respective holes substantially free from play, 5. The spectacles of claim 1 including biasing means for biasing said push-button toward said first position.

6. The spectacles according to claim 5 wherein said biasing means comprises a helical spring extending around said shank and having opposite ends abutted against said push-button and said first wing.

7. The spectacles of claim 1 wherein said lens means is mounted on a frame having an end of which extending between said wings of said clip and having said mortise formed therein.

* * * * *

UNITED STATES PATENT AND TRADEMARK OFFICE
CERTIFICATE OF CORRECTION

PATENT NO. : 5,035,498

DATED : July 30, 1991

INVENTOR(S) : Robert BOLLE

It is certified that error appears in the above-identified patent and that said Letters Patent is hereby corrected as shown below:

In claim 1, at column 4, line 44, delete "shield".

Signed and Sealed this

Twenty-third Day of March, 1993

Attest:

STEPHEN G. KUNIN

Attesting Officer

Acting Commissioner of Patents and Trademarks